United States Patent

Asano et al.

[11] Patent Number: 5,881,031
[45] Date of Patent: Mar. 9, 1999

[54] DISK APPARATUS HAVING IMPROVED PERFORMANCE IN REACHING TARGET POSITION ON DISK

[75] Inventors: Naotake Asano, Tokyo; Hiroyuki Onda, Higashikurume, both of Japan

[73] Assignee: Teac Corporation, Tokyo, Japan

[21] Appl. No.: 545,339

[22] Filed: Oct. 19, 1995

[30] Foreign Application Priority Data

Oct. 27, 1994 [JP] Japan ..................... 6-264194

[51] Int. Cl.$^6$ ............................. G11B 17/22; G11B 5/09
[52] U.S. Cl. ............................................. 369/32; 369/47
[58] Field of Search ............................... 369/32, 47, 48, 369/49, 50, 54, 58, 60, 44.28; 360/78.04, 78.08, 78.14

[56] References Cited

U.S. PATENT DOCUMENTS 5,222,054 6/1993 Muraska et al. .................. 369/44.28 X
5,491,677 2/1996 Sasaki .................... 369/60 X

FOREIGN PATENT DOCUMENTS 5274089 10/1993 Japan ................. G06F 3/06

*Primary Examiner*—Paul W. Huber
*Attorney, Agent, or Firm*—Ladas & Parry

[57] ABSTRACT

It is determined, according to a radial position of a pickup along a radius of a disk, whether or not to cause the pickup to jump to a different track so as to reduce a time required for reaching a target position on the disk. A reference value is used for the above-mentioned determination. The determination causes the pickup to jump to the different track when the target position on the disk is located behind the pickup, and also causes the pickup to jump to the different track when the target position on the disk is in front of the pickup and a distance to the target position is larger than the reference value. The reference value is determined to correspond to approximately one turn of the track at which the pickup is currently present. A buffer memory temporarily stores data which has been read out through said reading means. In response to an externally given first data transfer request, first requested data is read out from the buffer memory if it is present therein. The first requested data is read out from the disk if it is not present in the buffer memory. Data is further read, subsequent to the first requested data, from the disk continuously after the reading of the first requested data from the disk. The data thus further read is then stored in the buffer memory. When a second data transfer request is given during said reading the data subsequent to the first requested data, it is determined whether to further continue reading or to cause the pickup to jump to a different track so as to reach second requested data.

6 Claims, 9 Drawing Sheets

DISK APPARATUS HAVING IMPROVED PERFORMANCE IN REACHING TARGET POSITION ON DISK

This application claims priority from Japanese patent application No. 6-264194 filed Oct. 27, 1994. Said document is incorporated herein by reference.

BACKGROUND OF THE INVENTION

1. Field of the Invention

The present invention relates to a disk apparatus, in particular, to an optical-disc data reproducing apparatus having an advance reading function, and using a CLV (Constant Linear Velocity in disc rotation) method.

2. Description of the Related Art

A CD (Compact Disc) has been widely used for reproducing music tunes. However, use of the CD as a data recording medium especially for only reading data therefrom is beginning to increase, a CD so used being referred to as a CD-ROM. There are various types of drive apparatus for CD-ROMs (referred to as CD-ROM apparatus, hereinafter) having a function of double and/or triple disc-rotation-speed driving.

The double or triple disc-rotation-speed driving is such that the disc is rotated in such a CD-ROM apparatus at a rotation speed double or triple a disc rotation speed (1.2 through 1.4 m/s) at which a disc is rotated in a CD player for reproducing music tunes. Generally speaking, by increasing a disc rotation speed, it is possible to increase a data transfer rate.

Along with the increased data transfer rate, an advance reading function is being used. The advance reading function will now be described. A buffer memory is provided in a CD-ROM apparatus. When a host computer requests the CD-ROM apparatus to read out a certain block of data from a disc used as a data recording medium, the CD-ROM apparatus reads not only the thus-requested block of data but also a number of block of data from the disc. The thus-read number of blocks of data are those located immediately preceding or immediately subsequent to a location of the requested block along tracks of the disc. The thus-read number of blocks of data is stored in the buffer memory. Then, when the host computer subsequently requests the CD-ROM apparatus to read a certain block of data, the CD-ROM apparatus searches the number of blocks of data thus stored in the buffer memory. When the currently requested block of data is advantageously included in the stored number of block of data, the relevant block of data is transferred to the host computer from the buffer memory. Such an advantageous case is referred to as a cache-hit case or cache-hitting.

When the host computer requests the CD-ROM apparatus to transfer a certain block of data, the CD-ROM apparatus performs a seeking operation so as to search the disc for the requested block of data, reads it and transfers it to the host computer. Subsequently, the CD-ROM apparatus continues to read a number of blocks of data which are located immediately preceding or immediately subsequent to a location of the currently requested block of data along tracks of the disc. The thus-read number of blocks of data are stored in the buffer memory. An operation of reading the number of blocks of data and storing them in the buffer memory is referred to as an advance reading operation.

When the host computer requests the CD-ROM apparatus to transfer a certain block of data while performing the advance reading operation and the thus-requested block of data is not present in the buffer memory, the CD-ROM apparatus either continues the currently performed advance reading operation until the requested block data is thus reached or terminates the advance reading operation and performs a seeking operation to search the disc for the currently requested block of data. Thus, the CD-ROM apparatus obtains the requested block of data from the disc and transfers it to the host computer.

Whether the currently performed advance reading operation is continued until the requested block data is reached or the advance reading operation is terminated and a seeking operation is performed to search the disc for the requested block of data is determined using a predetermined reference number of blocks. Specifically, if a number of blocks of data present between a currently read block of data in a currently performed advance reading operation and a currently requested block of data is equal to or less than the predetermined reference number, the currently performed advance reading operation is continued. If the number of blocks of data present between the currently read block of data in the currently performed advance reading operation and the currently requested block of data is more than the predetermined reference number, the advance reading operation is terminated and a seeking operation is performed. Thus, it is possible to effectively reduce a time required for reaching, reading and transferring a requested block of data.

Such a CD-ROM apparatus uses the above-mentioned CLV method and thus a number of blocks of data stored in a single track of inner tracks is different from a number of blocks of data stored in a single track of outer tracks of a disc. Specifically, the number of blocks of data stored in a single track of outer tracks is as large as more than twice the number of blocks of data stored in a single track of inner tracks of the disc. Accordingly, during the seeking operation in which a read/write pickup of the CD-ROM apparatus jumps to a target track of the disc, a maximum time required for waiting for a target block of data is different between the inner tracks and outer tracks.

(In a case where the disc has a track format such that the tracks form a spiral, only one spiral-shaped track is formed on the disc. However, for the sake of simplification of description, when the pickup moves substantially perpendicular to a track extending line and thus reaches a track portion located laterally in parallel to a track portion at which the pickup has been located, it is expressed that 'the pickup jumps to a different track', in the specification and claims. Further, in this case, a turn among turns of the spiral track will be referred to as 'a track'.)

In fact, in a case where the target block of data passed through immediately before the pickup has reached the target track as a result of jumping, it is necessary for the pickup to wait for the target block of data to reach the pickup and thus wait for an approximately full turn of the disc. In other words, in this case, it is necessary for the pickup to wait for the target block of data to reach the pickup and thus wait for approximately a whole number of blocks of data present in the track to pass through. A time required for the target block of data to reach the pickup in such a case is the maximum time.

Therefore, because a number of blocks of data present in a single track of the outer tracks is larger than that of the inner tracks, the maximum time required for a target block of data reaching the pickup after the pickup has reached a relevant track in a case where the target block is present in the track of the outer tracks is longer than that in a case where a target block is present in a track of the inner tracks.

In description concerning the present invention, an expression such as 'the pickup reaches a target block of data' is used in such a case as that in which the pickup reaches a target track as a result of the seeking operation of the pickup and then a target block of data stored in the target track reaches the pickup as a result of a rotation of the disc.

In the CD-ROM apparatus in the related art, the above-mentioned predetermined reference number of blocks to be used for determining, in response to a transfer request during an advance reading operation, whether the advance reading operation is continued or a seeking operation is proceeded with is a single fixed number for the inner and outer tracks of the disc. Accordingly, if, for example, the predetermined reference number of blocks is determined according to a number of blocks of data present in a track of the inner tracks, although a target block of data is present in a track of the inner tracks, it is possible to effectively reduce a time required for the pickup to reach the target block of data as a result of determining an operation, to be performed, using the predetermined reference number of blocks.

However, if a target block of data is present in a track of the outer tracks, when the same predetermined reference number of blocks is used for determining an operation to be performed and as a result it is determined that a seeking operation is performed, it may not be possible to effectively reduce a time required for the pickup to reach the target block of data. Specifically, although this predetermined reference number of blocks of data is used and thus it is determined to perform a seeking operation, a time required for the pickup to reach the target block of data if a currently performed advance reading operation were continued may have been shorter than that in the case of performing the seeking operation. Thus, it may not be possible to effectively reduce a time required for the pickup to reach a target block of data and thus a data transfer rate may be degraded.

SUMMARY OF THE INVENTION

An object of the present invention is to provide a disk apparatus, using the above-mentioned CLV method, having an improved data transfer rate as a result of appropriately determining an operation to be performed when a data transfer request is received during an advance reading operation regardless of whether a target block of data is present in a track of inner tracks or outer tracks.

A disk apparatus according to the present invention determines, according to a radial position of a pickup along a radius of a disk, whether or not to cause the pickup to jump to a different track so as to reduce a time required for reaching a target position on the disk.

It is preferable to use a reference value for the above-mentioned determination. The determination causes the pickup to jump to a different track when the target position on the disk is located behind the pickup. The determination also causes the pickup to jump to a different track when the target position on the disk is in front of the pickup and a distance to the target position is larger than the reference value.

The reference value may be determined to correspond to approximately one turn of the track at which the pickup is currently present.

A case will now be considered in which a track format of the disk is such that the tracks form a spiral. If the pickup is jumped to a different track, a maximum possible time required for the pickup to reach the target position present along the reached track is a time required for one turn of the disk. In contrast to this, if the pickup does not jump to a different track but traces the track which forms the spiral, a time required for the pickup to reach the target position is a time required for the pickup to move a distance to the target position along the track forming the spiral.

Therefore, when the distance to the target position along the spiral-shaped track is within a distance of one turn of the track, it may be advantageous to trace the track without jumping to a different track. In contrast to this, when the distance to the target position along the spiral-shaped track is more than a distance of one turn of the track, it may be advantageous to jump to a different track along which the target position is present. In the disk for the disk apparatus of the CLV method, if a relevant track is an outer track, a length of a turn of track is larger than that for an inner track and, thus, the reference value is larger accordingly.

The disk apparatus may further comprise a buffer memory for temporarily storing data which has been read out through reading means. In response to an externally given first data transfer request, first requested data is read out from the buffer memory if it is present therein. The first requested data is read out from the disk if it is not present in the buffer memory. Data subsequent to the first requested data is further read from the disk continuously after the reading of the first requested data from the disk. The data thus further read is then stored in the buffer memory.

When a second data transfer request is given during said reading of the data subsequent to the first requested data, it is determined, according to a radial position of the pickup along a radius of the disk, whether to further continue reading or to cause the pickup to jump to a different track so as to reach second requested data.

Other objects and further features of the present invention will become more apparent from the following detailed description when read in conjunction with the accompanying drawings.

DESCRIPTION OF PREFERRED EMBODIMENTS

Figure 1:
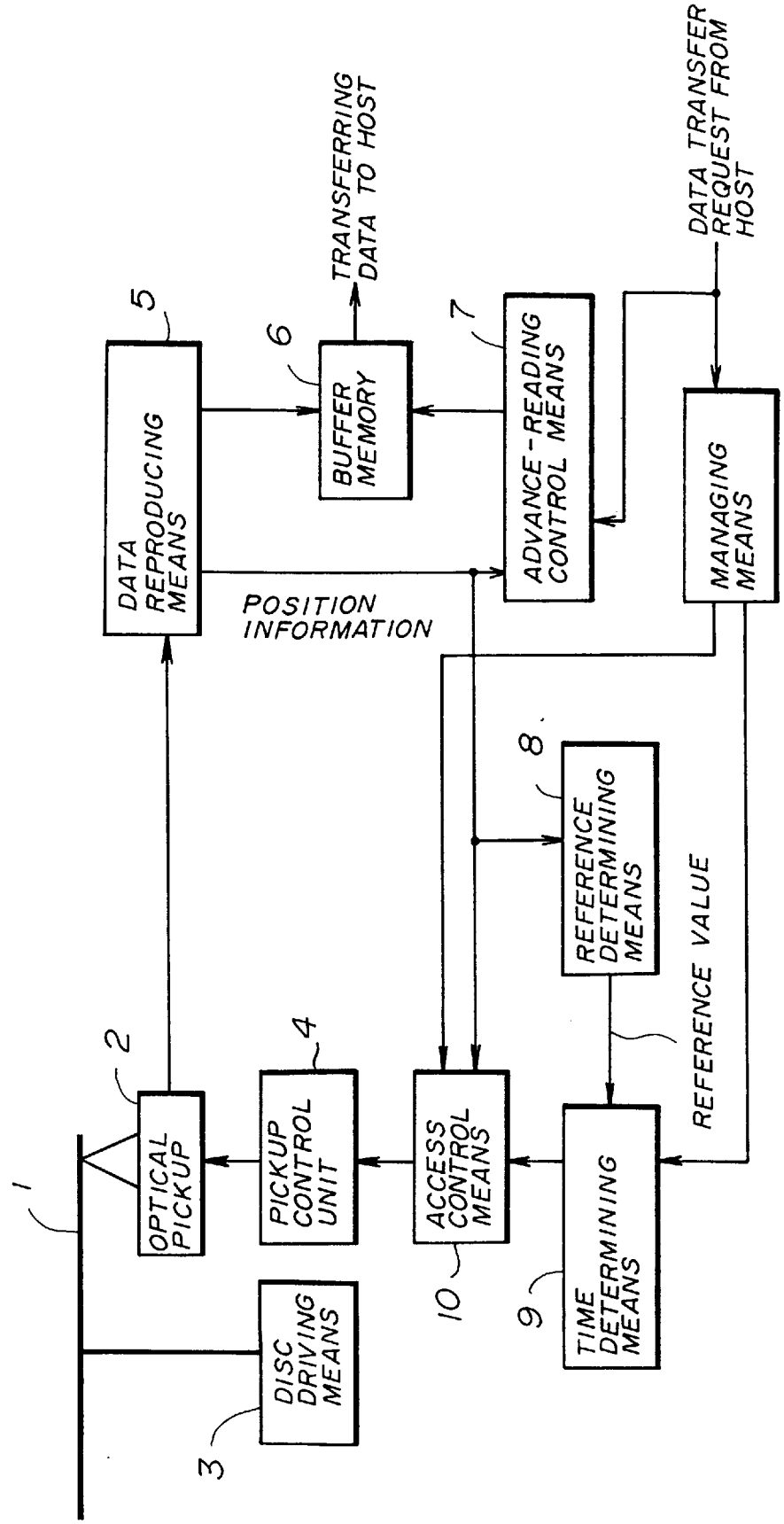
FIG. 1 shows a block diagram of a first embodiment of the present invention.

With reference to FIG. 1, an optical-disc data-reproducing apparatus in a first embodiment of the present invention will now be described. An optical disc 1 is rotated by disc driving means 3 in a condition in which a linear speed is fixed. A position of an optical pickup 2 is controlled by a pickup control unit 4.

Data reproducing means 5 reproduces data using a signal read out from a track of the optical disc 1 through the optical pickup 2. A buffer memory 6 stores the data reproduced by the data reproducing means 5.

Advance-reading control means 7 responds to a data transfer request from a host system and thus causes the data reproduced by the data reproducing means 5 to be transferred to the host system. Then, the advance-reading control means 7 causes the buffer memory 6 to store a predetermined length of data which is reproduced by the data reproducing means 5. The advance-reading control means 7 also causes the optical pickup 2 to continue, along tracks of the optical disc, to read data positioned subsequent to the above-mentioned data having been transferred to the host system.

Reference determining means 8 uses position information of the data reproduced by the data reproducing means 5 and thus determines a position, along a radius of the optical disc, of a track, from which data is currently read. Then, the reference determining means 8 determines a reference value according to the thus-determined radial position on the optical disc.

Time determining means 9 responds to another data transfer request from the host system during an advance reading operation. The determining means 9 then determines, using the thus-determined reference value, which time is shorter, a time required for reaching the currently requested data by continuing the currently performed advance reading operation or a time for the same purpose by terminating the advance reading operation and performing a seeking operation.

Access control means 10, according to the determination result of the time determining means 9, uses the pickup control unit 4 for controlling continuation of the advance reading operation or performance of the seeking operation so that the optical pickup 2 can be located at a position on the optical disc 1 at which the currently requested data is stored.

Managing means 11, when the host system newly requests to transfer data which is located subsequent to or preceding a location from which data is read out in the currently performed advance reading operation, causes the time determining means 9 to perform a relevant determination operation such as that described above. The managing means 11, in a case other than the above-mentioned case and if currently requested data is not present in the buffer memory 6, causes the access control means 10 to proceed with a seeking operation and causes the optical pickup 2 to be located at a position at which the currently requested data is stored.

Thus, the optical-disc data-reproducing apparatus in the first embodiment of the present invention responds to a data transfer request given during an advance reading operation, and thus determines the reference value according to the radial position of the optical pickup on the optical disc. Then, using the reference value, the apparatus appropriately determines, regardless of whether the current position of the optical pickup is in a track of the inner tracks or outer tracks, which time is shorter, a time required for reaching a position on the optical disc 1 at which the currently requested data is stored by continuing the currently performed advance reading operation or a time for the same purpose by terminating the advance reading operation and performing a seeking operation.

Thereby, one of an operation of continuing the currently performed advance reading operation and an operation of proceeding with a seeking operation is selected such that a time required for reaching the position on the optical disc 1 at which the currently requested data is stored is shorter. Thus, it is possible to improve a data transfer rate regardless of whether the current position of the optical pickup is in a track of the inner tracks or outer tracks.

In a CD-ROM, which is a kind of an optical disc as mentioned above, blocks of data are stored wherein each block includes 2352 bytes and each byte contains 8 bits. Each block is stored in the CD-ROM in the CLV method so as to be reproduced in 1/75 seconds when the disc rotates at a normal rotation speed. 9 blocks of data are stored in the innermost track and 21 blocks of data are stored in the outermost track.

Figure 2:
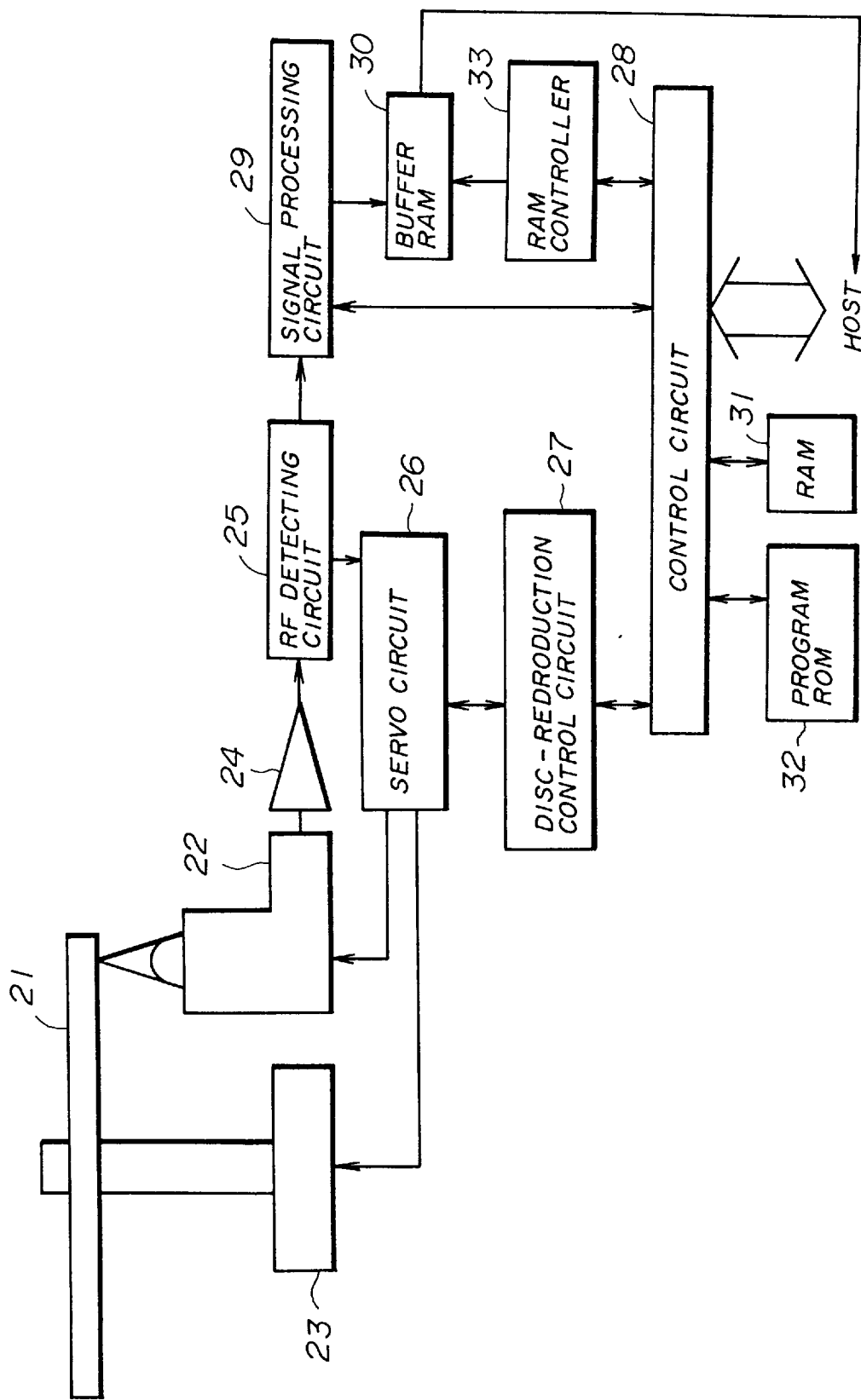
FIG. 2 shows a block diagram of a CD-ROM apparatus in a second embodiment of the present invention.

With reference to FIG. 2, a CD-ROM apparatus in a second embodiment of the present invention will now be described. In the second embodiment, a more specific arrangement of the apparatus is defined for embodying the present invention. The data reproducing means includes an amplifier 24, an RF detecting circuit 25, and a signal processing circuit 29. The pickup control unit includes a servo circuit 26 and a disc-reproduction control circuit 27. The disc driving means includes a disc motor 23, the servo circuit 26 and the disc-reproduction control circuit 27.

An optical disc (CD-ROM) 21 is driven by the disc motor 23. A control circuit 28 controls the disc motor 23 and a motor for moving a pickup (optical pickup) 22 forward and backward, through the disc reproduction control circuit 27 and servo circuit 26.

Laser beams emitted by the pickup 22 are reflected by a recording surface of the disc 21 and then received by the pickup 22. The thus-received light beams are converted into a reproduction signal through the pickup 22 and then supplied to the RF detecting circuit 25 via the amplifier 24. The RF detecting circuit 25 shapes a waveform of the reproduction signal and then supplies the signal to the servo circuit 26 and signal processing circuit 29.

The servo circuit 26 uses the thus-supplied reproduction signal and thus performs a focus-servo control operation and a tracking-servo operation of the pickup 22, and also a servo control operation of the motor for moving the pickup 22 forward and backward. Further, the servo circuit 26 supplies a control signal to the disc motor 23 so as to perform a CLV (Constant Linear Velocity in disc rotation) servo control operation.

The reproduction signal supplied from the RF detecting circuit 25 to the signal processing circuit 29 undergoes an EFM demodulating operation. Thus, a synchronization signal and address data are separated from the reproduction signal, which is then written in a buffer RAM 30 as blocks of reproduction data. The reproduction data read out from the buffer RAM 30 is transferred to a host computer. Under the control by the control circuit 28, a RAM controller 33 controls writing the reproduction data in and reading it from the buffer RAM 30.

The address data is stored in a RAM 31 through the control circuit 28 and used for a desired data search operation or the like. A program ROM 32 stores control programs which the control circuit 28 executes and rotation-speed information for each address in a recording area of the disc 21 to be used for the CLV servo control of the disc motor 23.

Figure 4:
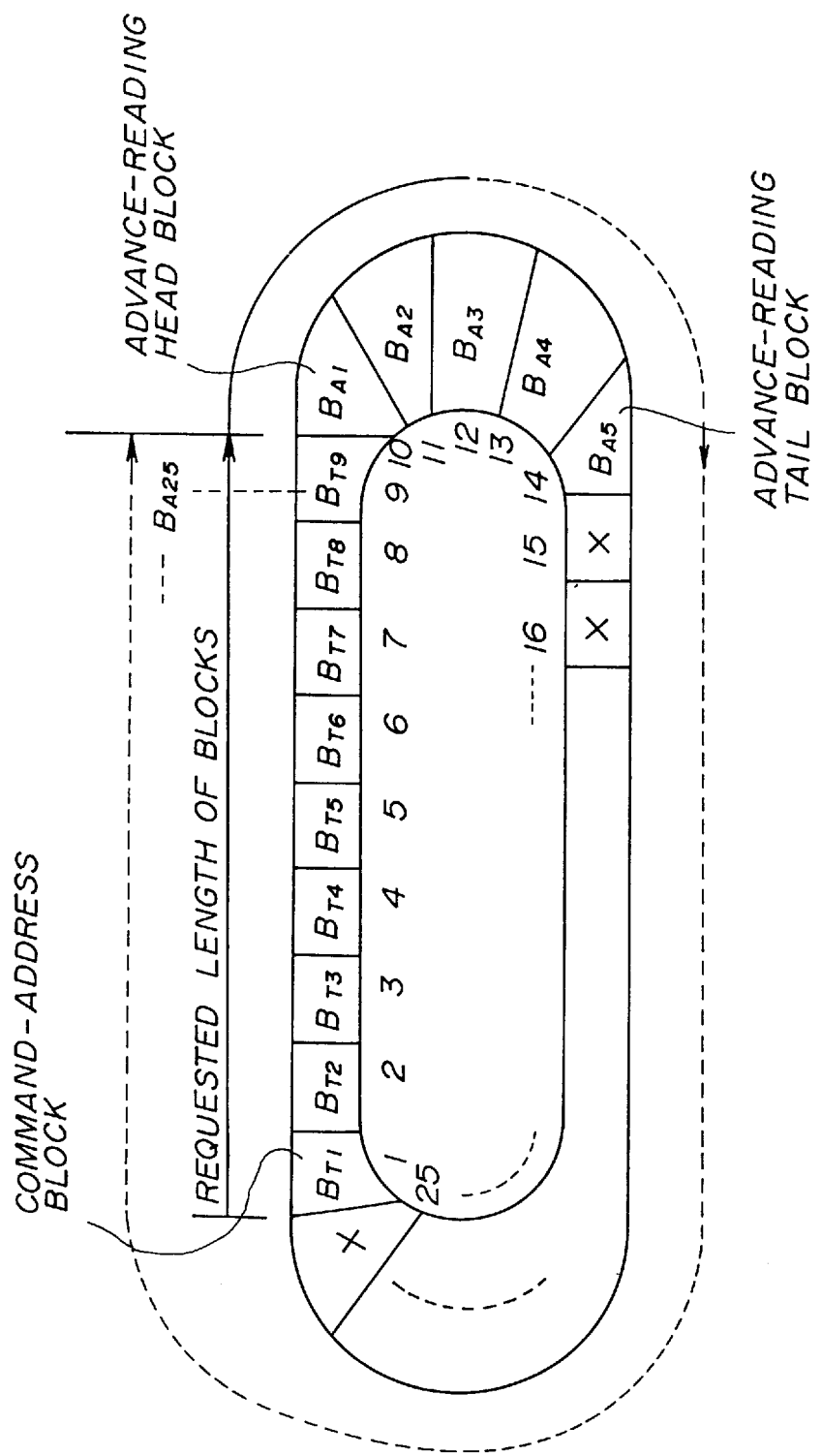
FIG. 4 illustrates data storage in a buffer and a buffer arrangement.

The buffer RAM 30 is a ring buffer for storing data obtained as a result of the advance reading process, and includes, for example, 25 regions as shown in FIG. 4. Thus, the buffer RAM 30 has a storage capacity of 25 blocks of data. The control circuit 28 stores therein information, as a cache list, indicating an address of a block of data stored in each region of these 25 regions of the buffer RAM 30.

Figure 3:
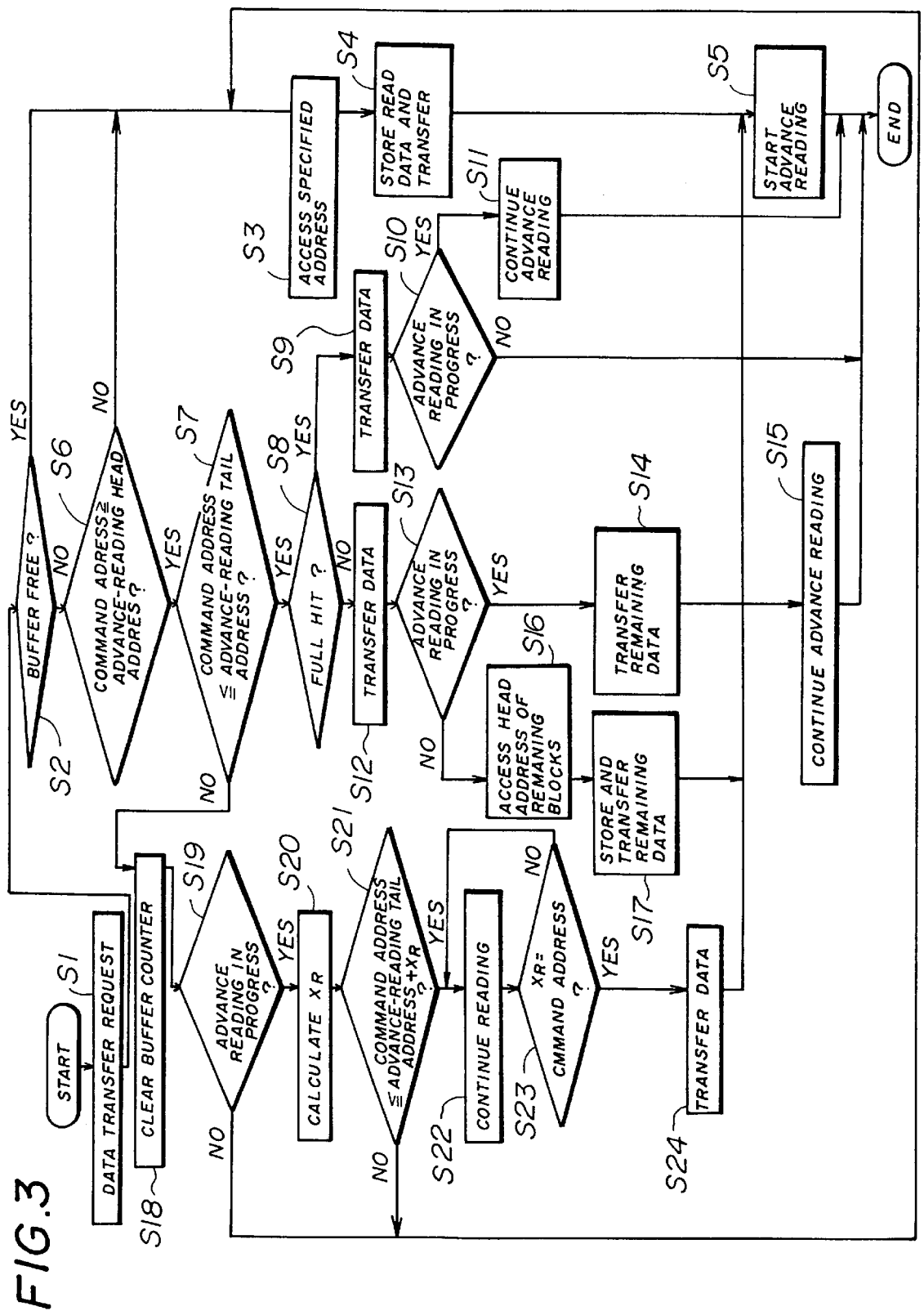
FIG. 3 shows an operation flowchart of an operation of the apparatus shown in FIG. 2.

With reference to FIG. 3, an operation flow of an operation which the CD-ROM apparatus in the second embodiment of the present invention performs in response to a data transfer request from the host computer will now be described. The operation shown in FIG. 3 is performed by the control circuit 28 according to the control programs stored in the program ROM 32.

In the flowchart shown in FIG. 3, processes of steps S1, S2, S6, S7 and S19 (the term 'step' being omitted, hereinafter) correspond to those performed by the above-mentioned managing means. Processes of S4, S24 and S5 correspond to those performed by the above-mentioned advance-reading control means. A process of S20 corresponds to that performed by the above-mentioned reference determining means, and a process of S21 corresponds to that performed by the time determining means. Processes of S3, S22 and S23 correspond to those performed by the access control means.

When the host computer gives a data transfer request to the control circuit 28 in S1, the control circuit 28 determines in S2 by referring to the cache list whether or not data has been stored in the buffer RAM 30 (referred to simply as a buffer 30, hereinafter) as a result of a previously performed advance reading operation. If it is determined in S2 that no data has been stored in the buffer 30, the seeking operation is proceeded with for accessing a block address (command address), specified by the above-mentioned data transfer request, in the recording area of the disc 21, in S3.

After the completion of the seeking operation, in S4, a reading operation is performed on the command address and thus a length of data, starting at the command address, requested by the data transfer request is read out. Then, the thus-read-out data is stored, one block by one block in sequence, in predetermined regions (for example, those starting at the region No.1) of the buffer 30 via the signal processing circuit 29. Simultaneously, the thus-stored data is transferred to the host computer in a manner in which data is transferred immediately after being stored in the buffer 30, for example, when each byte of data has been stored in the buffer 30, then it is immediately transferred to the host computer after being read out from the buffer 30.

When storage and transfer of the requested length of data have been completed, the currently performed reading operation is continued and in S5 the advance reading process is thus started. Specifically, regions of the buffer 30 are used in the advance reading operation. The thus-used regions are those starting at a region immediately subsequent to a region which was used last in the storage of the above-mentioned requested length of data. In the advance reading operation, blocks of data which have been read out from the disc 21 are stored in the regions of the buffer 30 in sequence.

FIG. 4 illustrates the example of the arrangement of the buffer 30 and data storage therein. In this example, nine continuous blocks $B_{T1}$ to $B_{T9}$ starting from a block $B_{T1}$ led to by the command address are read out from the disc 21 and then stored in the regions No.1 to No.9 of the buffer 30, respectively, in sequence. Simultaneously, the thus-stored blocks of data are transferred to the host computer. Then, in the advance reading operation, continuous blocks starting from a block $B_{A1}$ immediately subsequent to the block $B_{T9}$ are read out and then are stored in regions of the buffer 30 starting from the region No.10, respectively, in sequence.

This data storage in the buffer 30 in the advance reading operation is performed in a manner in which a block of data is overwritten on a previously written one. In the advance reading operation, if another data transfer request is not given, blocks of data are stored in the buffer 30 as mentioned above until a number of the thus-stored blocks of data during this advance reading operation reaches '25'. Thus, the 25 regions of the buffer 30 are filled by the 25 blocks of data stored in this advance reading operation. Then, the advance reading operation is terminated. In this state, the block of data stored last in the. advance reading operation is located immediately preceding the block of data stored first in the advance reading operation. The block of data stored first in the advance reading operation will be referred to as an advance-reading head block of data and the block of data stored last in the advance reading operation will be referred to as an advance-reading tail block of data.

In the example of FIG. 4, the five blocks $B_{A1}$ to $B_{A5}$ starting at the advance-reading head block $B_{A1}$ are stored. In this state, the block $B_{A5}$ is the advance-reading tail block. If another data transfer request is not given, the advance reading operation is further continued and as a result, the 25 blocks $B_{A1}$ to $B_{A25}$ of data are stored. When the block $B_{A25}$ which is the advance-reading tail block is stored in the region No.9 of the buffer 30, the advance reading operation is terminated.

Thus, the advance reading operation started in S5 is terminated and then another data transfer request is waited for. When the data transfer request is given, S1 is again started.

If it is determined in S2 that data has been stored in the buffer 30 as a result of a previously performed advance reading operation, it is determined in S6 and S7 whether or not blocks of data requested by the current data transfer request are included in the data stored in the buffer 30, that is, whether or not it is a cache hit case.

Specifically, in S6, it is determined whether or not the requested command address is equal to or larger than an address of a block of data in the disc corresponding to the advance-reading head block stored in the buffer 30. The address of the block of data in the disc corresponding to the advance-reading head block stored in the buffer 30 will be referred to as an advance-reading head address, hereinafter. If it is determined in S6 that the command address is smaller than the advance-reading head address, it is determined that the block of data specified by the command address precedes (that is, located at an inner side in the disc 21) the block of data corresponding to the advance-reading head block of data stored in the buffer 30. Accordingly, a head part of the requested data is not present at the buffer 30 and thus the seeking operation is performed in S3.

If it is determined in S6 that the command address is equal to or larger than the advance-reading head address, it is determined in S7 whether or not the requested command address is equal to or smaller than an address of a block of data in the disc corresponding to the advance-reading tail block stored in the buffer 30. The address of the block of data in the disc corresponding to the advance-reading tail block stored in the buffer 30 will be referred to as an advance-reading tail address, hereinafter. If it is determined in S7 that the command address is equal to or smaller than the advance-reading tail address, it is determined that at least the head part of the requested blocks of data is stored in the buffer 30. Then an operation of S8 to S17 for the cache-hit case is performed.

S8 determined whether or not all of the requested blocks of data are included in the advance-reading data stored in the buffer 30. A state in which all of the requested blocks of data are included in the advance-reading data will be referred to as a full hit state, hereinafter. If it is the full hit state, the requested blocks of data are read out from the buffer 30 and transferred to the host computer in S9.

A case will now be considered in which the current data transfer request is given during continuation of the advance reading operation performed for an immediately previous data transfer request. This case is also a case where advance-reading blocks of data are present in the buffer 30. These advance-reading blocks of data are those which have been stored in the advance reading operation. This advance reading operation is one which was performed after the data transfer operation in S9 which was performed for the current data transfer request. In this case, a block of the advance-reading blocks immediately subsequent to the last block of the blocks which have been transferred in response to the current data transfer request is one which will be treated as an 'advance-reading head block after the data transfer operation'.

Another case will now be considered in which the current data transfer request is given after completion of the advance reading operation performed for a previous data transfer request. This case is also a case where advance-reading blocks are present in the buffer 30, which advance-reading blocks of data have been stored in the advance reading operation. This advance reading operation is one which was performed after the data transfer operation in S9 which was performed for the current data transfer request. Also in this case, a block of the advance-reading blocks immediately subsequent to the last block of the blocks which have been transferred in response to the current data transfer request is one which will be treated as an 'advance-reading head block after the data transfer operation'.

Figure 5:
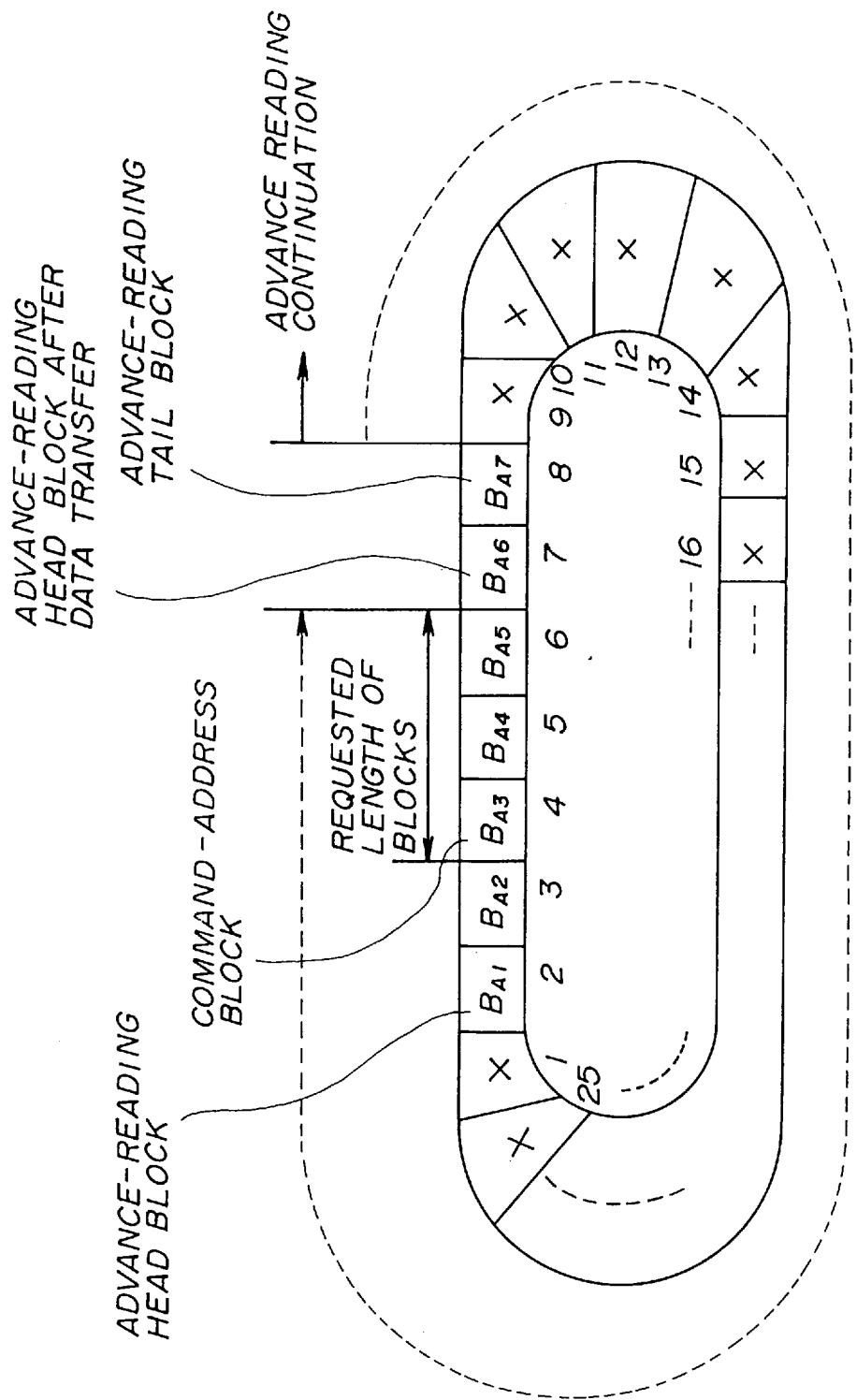
FIG. 5 illustrates data storage in the buffer in a case where an advance reading operation performed after a previous data transfer request is in progress.
Figure 6:
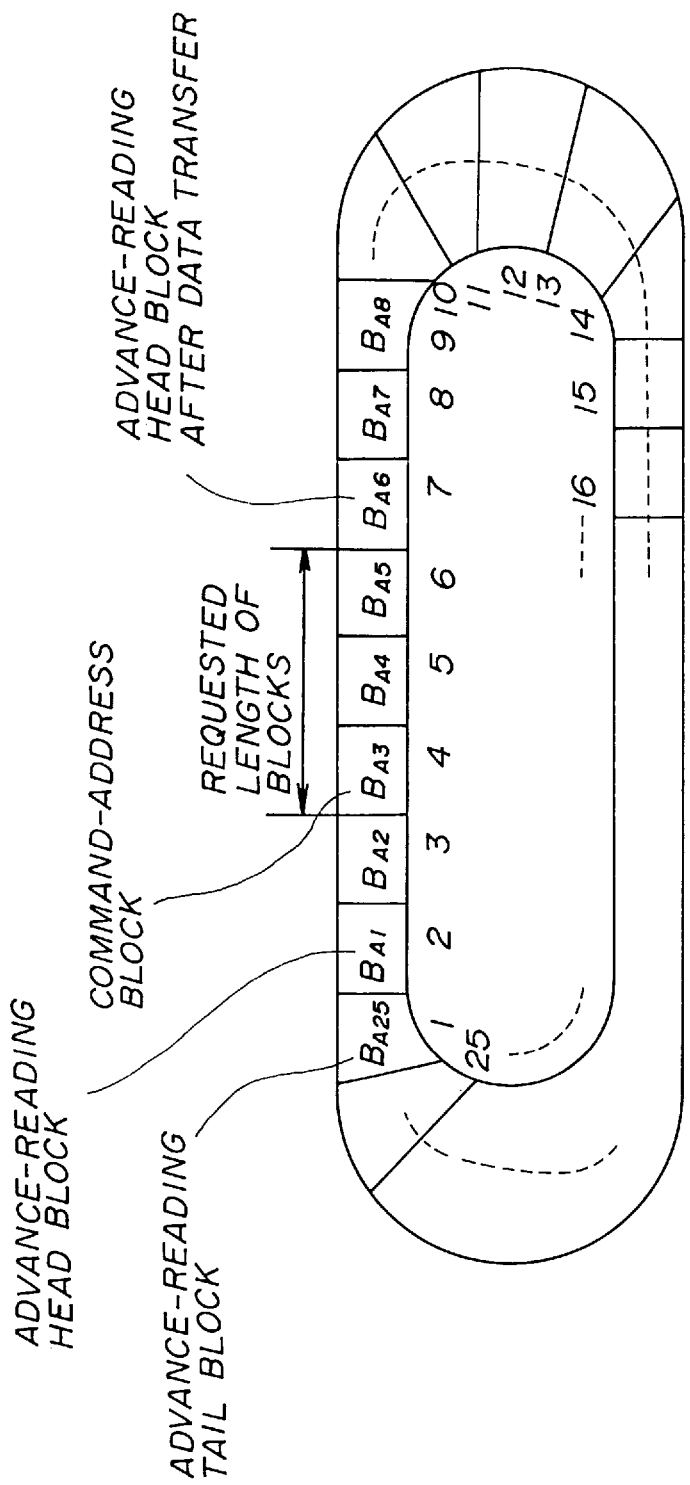
FIG. 6 illustrates data storage in the buffer in a case where an advance reading operation performed after a previous data transfer request has been completed.

FIG. 5 illustrates an example of data storage in the buffer 30 during the advance reading operation being performed after the previous data transfer request. FIG. 6 illustrates an example of data storage in the buffer 30 after completion of the advance reading operation performed after the previous data transfer request.

In the example shown in FIG. 5, during continuation of the advance reading operation, the buffer 30 stores seven blocks of data starting at the advance-reading head block $B_{A1}$ and ending at the advance-reading tail block $B_{A7}$ in the seven regions No.2 to No.8, respectively. During continuation of this advance reading operation, another data transfer request is given for transferring three blocks $B_{A3}$ to $B_{A5}$ of data starting from the block $B_{A3}$ specified by the command address. After these blocks $B_{A3}$ to $B_{A5}$ of data are transferred in S9, the block $B_{A6}$ is treated as the advance-reading head block. Further, the five blocks $B_{A1}$ to $B_{A5}$ of data are ineffective data.

In the example shown in FIG. 6, after the completion of the advance reading operation, the buffer 30 stores 25 blocks of data starting at the advance-reading head block $B_{A1}$ and ending at the advance-reading tail block $B_{A25}$ in the 25 regions No.2 to No.1, respectively, in the advance reading operation. Then, another data transfer request is given for transferring three blocks $B_{A3}$ to $B_{A5}$ of data starting from the block $B_{A3}$ specified by the command address. In this example, similar to that of FIG. 5, after these blocks $B_{A3}$ to $B_{A5}$ of data are transferred in S9, the block $B_{A6}$ is treated as the advance-reading head block. Further, the five blocks $B_{A1}$ to $B_{A5}$ of data are ineffective data.

In S10, it is determined whether or not the advance reading operation performed after the previous data transfer request is in progress. If it is determined as a result that the advance reading operation has been completed, the current cycle of the operation is terminated and Si will be performed when another data transfer request is given.

If S10 determines that the advance reading operation is in progress, S11 performs the advance reading operation as that performed after the current data transfer request, in which advance reading operation the above-mentioned 'advance-reading head block after the data transfer operation' determined in S9 is used. In the example of FIG. 5, the 'advance-reading head block after the data transfer operation' $B_{A6}$ stored in the region No.7 of the buffer 30 is used. Thus, as long as another data transfer request is not given, in the advance reading operation performed after the current data transfer request, 25 continuous blocks of data is stored in the 25 continuous regions No.7 to No.6 respectively.

After S11, the current cycle of the operation is terminated, and S1 is performed when another data transfer request is given.

If S8 determined that only the head part of the requested blocks of data is included in the data which was previously stored in the buffer 30 as a result of the advance reading operation (such a case being referred to as a 'front hit case'), in S12, the part of data included in the buffer 30 is transferred to the host computer.

Figure 7:
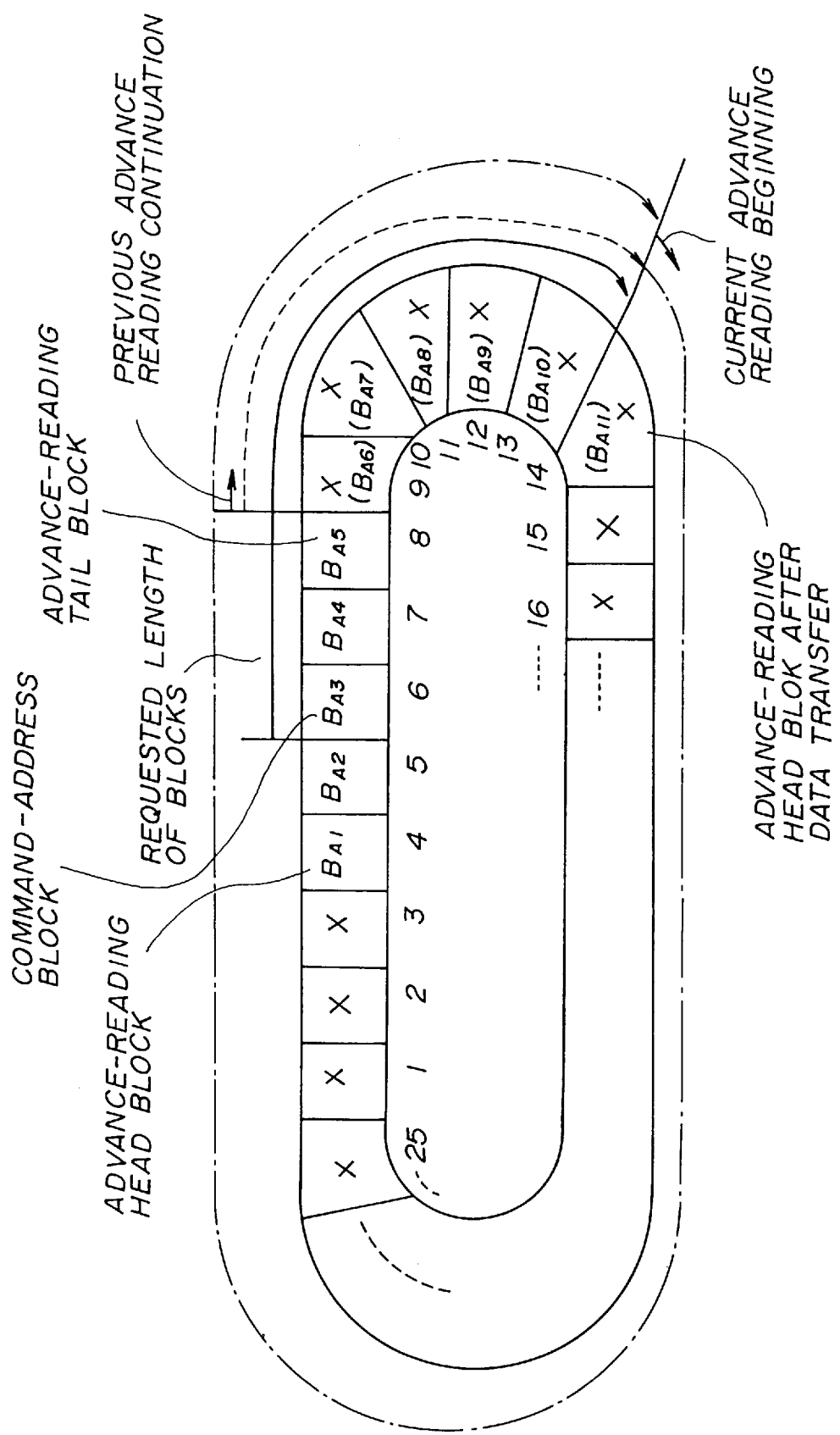
FIG. 7 illustrates data storage in the buffer in a case where an advance reading operation performed after a previous data transfer request is in progress in a front hit case.

FIG. 7 illustrates data storage in the buffer 30 in the front hit case when the advance reading operation performed after the previous data transfer request is in progress. Further, FIG. 8 illustrates data storage in the buffer 30 in the front hit case when the advance reading operation performed after the previous data transfer request has been completed.

In the example of FIG. 7, the advance reading operation in progress stores the five blocks $B_{A1}$ (the advance-reading head block) to $B_{A5}$ (advance-reading tail block) in the regions No.4 to No.8 respectively. Then, the data transfer request is given so as to transfer eight blocks $B_{A3}$ (specified by the command address) to $B_{A10}$. In S12, the three hit blocks $B_{A3}$ to $B_{A5}$ of data are transferred to the host computer. In parallel with this data transfer operation, the advance reading operation performed after the previous data transfer request is still in progress. Thus, blocks starting from $B_{A6}$ subsequent to the above-mentioned advance-reading tail block $B_{A5}$ are stored in regions starting at the region No.9 respectively.

Figure 8:
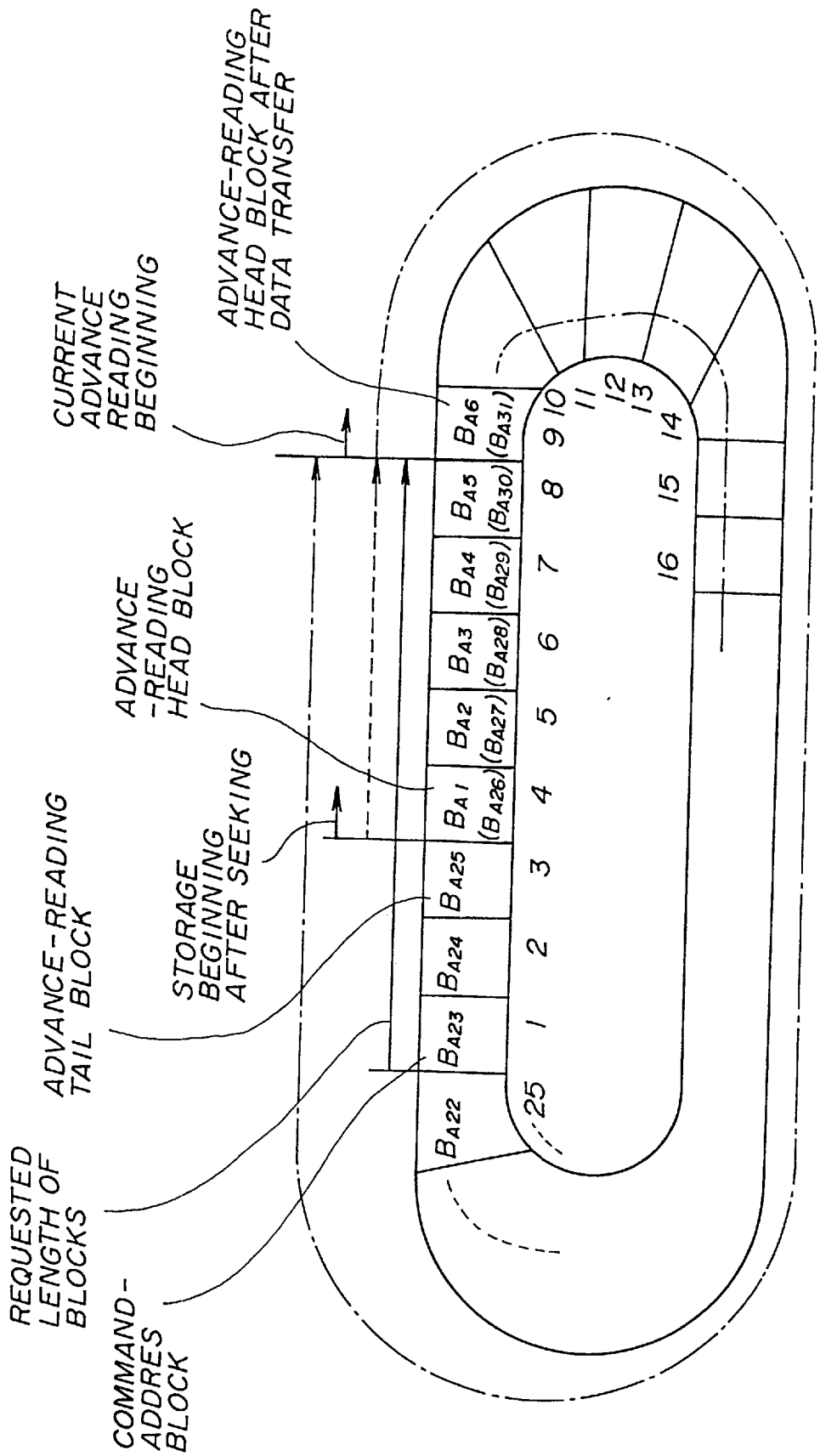
FIG. 8 illustrates data storage in the buffer in a case where an advance reading operation performed after a previous data transfer request has been completed in the front hit case.

In the example of FIG. 8, the advance reading operation performed after the previous data transfer request has been completed and thus 25 continuous blocks $B_{A1}$ (the advance-reading head block) to $B_{A25}$ (advance-reading tail block) have been stored in the 25 continuous regions No.4 to No.3 respectively. Then, a data transfer request is given to transfer eight continuous blocks $B_{A23}$ (specified by the command address) to $B_{A30}$. In this example, in S12, the three hit blocks $B_{A23}$ to $B_{25}$ are transferred.

In S13, it is determined whether or not the advance reading operation performed after the previous data transfer request is in progress. If the advance reading operation has been completed, a seeking operation is performed so that the head block of the remaining blocks of the requested blocks of data is accessed in S16. After the seeking operation has been completed, the remaining blocks of data are stored in the buffer 30 and transferred to the host computer in S17. In the example of FIG. 8, after the completion of the seeking operation, the remaining blocks $BA_{26}$ to $B_{A30}$ of data subsequent to the already-transferred blocks $B_{A23}$ to $B_{A25}$ are overwritten in the regions No.4 to No.8 respectively and are simultaneously transferred to the host computer.

After the completion of the data transfer operation in S17, the advance reading operation performed after the current data transfer request proceeds in S5. In the example of FIG. 8, at the beginning of the advance reading operation performed after the current data transfer request, the block $B_{A31}$ of data is stored in the region No.9 as the 'advance-reading head block after the data transfer operation'. As long as another data transfer request is not given this advance reading operation stores 25 blocks of data in 25 regions No.9 to No.8 respectively. After the completion of S5, the current cycle of the operation is terminated, and S1 is performed when another data transfer request is given.

If S13 determined that the advance reading operation is in progress, S14 transfers the remaining blocks of the requested data to the host computer. Specifically, the advance reading operation in progress continues to store blocks of data in the buffer 30 and the thus-stored blocks include the remaining blocks of the requested data. These remaining blocks of data are read out from the buffer 30 and transferred to the host computer. In the example of FIG. 7, the blocks $B_{A6}$ to $B_{A10}$ subsequent to the already-transferred blocks $B_{A3}$ to $B_{A5}$ are stored in the regions No.9 to No.13 of the buffer 30 respectively in the continuing advance reading operation. The thus-stored blocks $B_6$ to $B_{10}$ of data are then read out from the buffer 30 and transferred to the host computer.

When the data transfer operation in S14 has been completed, a block of data subsequent to the last block of the thus-transferred blocks has been stored in the buffer 30 by the continuing advance reading operation performed after the previous data transfer request. The thus-stored block of data is the 'advance-reading head block after the data transfer operation'. Then, in S15, the advance reading operation performed after the current data transfer request proceeds such that the thus-stored 'advance-reading head block after the data transfer operation' is used.

In the example of FIG. 7, the advance reading operation performed after the current data transfer request is performed such that a block $B_{A11}$ stored in the region No.14 is the 'advance-reading head block after the data transfer operation'. As long as another data transfer request is not given, this advance reading operation stores 25 blocks of data in the 25 regions No.14 to No.13 of the buffer 30 respectively. After the completion of S15, the current cycle of operation is terminated, and S1 is performed when another data transfer request is given.

If S7 determines that the command address is larger than an address of the advance-reading tail block (advance-reading tail address) stored in the buffer 30, S18 is performed. S18 clears a buffer counter so as to make a count number of the buffer counter be zero. The buffer counter is used in S23, described later, for determining whether the command address is reached. Then, S19 determines whether or not the advance reading operation performed after the previous data transfer request is in progress. If the advance reading operation performed after the previous data transfer request has been completed, S3 is performed. S3 performs a seeking operation. If the advance reading operation performed after the previous data transfer request is in progress, S20 is performed.

S20 calculates a reference number $X_R$ using the advance-reading tail address as will be described later. The reference number $X_R$ is used for determining, when a data transfer request is given during progress of the advance reading operation, whether the advance reading operation in progress should be further continued or a seeking operation should be proceeded with. Then S21 determines whether or not a difference between the command address and the advance-reading tail address is smaller than the reference number $X_R$. If the difference is larger than the reference number $X_R$, it is determined that performing of a seeking operation can reduce a time required for reaching the command address in comparison to the case of further continuing the advance reading operation. As a result, S3 performs a seeking operation.

If S21 determined that the difference between the command address and the advance-reading tail address is equal to or smaller than the reference number $X_R$, it is determined that further continuing the advance reading operation can reduce a time required for reaching the command address in comparison to the case of proceeding with a seeking operation. As a result, S22, S23 continue the advance reading operation until the command address is reached. Data stored in the buffer 30 during the thus-continuing advance reading operation until the command address is reached is ineffective data which will not be used.

During a reading operation performed in the thus-continuing advance reading operation in S22, a count number of the above-mentioned buffer counter is incremented by one as another subsequent block of data is read. S23 determines whether the thus-incremented count number of the buffer counter reaches a number resulting from subtracting the advance-reading tail address used in S21 from the command address. If the thus-incremented count number of the buffer counter reaches the number resulting from subtracting the advance-reading tail address used in S21 from the command address, it is determined that a block of data of the command address is reached. As a result, S24 proceeds with a data transfer operation.

How to calculate the reference number $X_R$ will now be described. The reference number $X_R$ is a maximum possible number of blocks of data which pass in front of the pickup 22 during a time which is required for the pickup 22 to jump to a different track in a seeking operation, start an effective data reading operation on the track and be reached by a target block of data along the track. The thus-calculated reference number $X_R$ is such that, when the seeking operation is performed, the maximum required time is a time during which the number $X_R$ of blocks of data could pass in front of the pickup 22 if the advance reading operation were continued.

A case will be considered in which the target block is located a certain number of blocks of data forward. In this case, when the seeking operation proceeds, regardless of this certain number of blocks of data, the maximum possible required time is a time during which $X_R$ blocks of data could pass in front of the pickup 22 if the advance reading operation were continued. In contrast to this, when the advance reading operation is continued, a time required for the target block to reach the pickup 22 is a time during which the above-mentioned certain number of blocks of data pass in front of the pickup. (In this embodiment, a track format of the disc 21 is such that the tracks form a spiral.) Accordingly, when the certain number of blocks of data is larger than $X_R$, the time required when the advance reading operation is continued is longer than the time required when the seeking operation is proceeded with.

When the pickup 22 shown in FIG. 2 jumps several tracks to a different track, approximately 10 ms is required. This 10 ms corresponds to a time during which approximately one block of data passes in front of the pickup 22. When data reading is attempted by the pickup 22 immediately after the completion of the jumping operation thereof, a reading error may occur due to vibration of the pickup 22 or the like. Accordingly, an effective reading can be performed after approximately three more blocks of data pass in front of the pickup 22. Then, the maximum possible time required for the target block of data, present in a track at which the pickup 22 is located, to reach the pickup 22 is a time required for a number of blocks of data present in one turn of a track to pass in front of the pickup 22.

Accordingly, a number of blocks of data, which pass in front of the pickup 22 in the track during the maximum possible time required for the target block of data to reach the pickup 22 if the seeking operation is proceeded with, is obtained as a result of adding four to a number of blocks of data present in one turn of the track. The resulting number is used as the reference number $X_R$. Therefore, the reference number $X_R$ is obtained as a result of adding four to a number of blocks of data present in one turn of the track.

If a difference between a position (the advance-reading tail address) from which data is currently read and a target position (the command address) is equal to or smaller than a distance corresponding to the reference number $X_R$, it is determined that further continuation of the advance reading operation can comparatively reduce a time required for the pickup 22 to reach the target position. If this difference is larger than the distance corresponding to the reference number $X_R$, it is determined that proceeding with the seeking operation can comparatively reduce the time required for the pickup operation to reach the target position.

In the CD-ROM to be loaded in the CD-ROM apparatus using the CLV method, an outer track has a larger number of blocks of data than that which an inner track has, because a length of one turn of an outer track is longer than that of an inner track. Accordingly, the reference number $X_R$ for an outer track is different from that for an inner track.

As mentioned above, the reference number $X_R$ is obtained as a result of adding four to a number of blocks of data present in one turn of track. A number of blocks of data present in one turn of the innermost track is nine. Accordingly, the reference number $X_R$ for the innermost track is obtained as a result of adding four to nine. The resulting reference number $X_R$ is 13. A number of blocks of data present in one turn of the outermost track is 21. Accordingly, the reference number $X_R$ for the outermost track is obtained as a result of adding four to 21. The resulting reference number $X_R$ is 25. Thus, the reference number $X_R$ has a range between 13 to 25 for disc-radial positions (positions along a radius of the disc 21) of tracks.

In S20, a position (disc-radial position) on the disc 21 from which data is currently read out is obtained from the current advance-reading tail address. Then, a number of blocks of data present in one turn of track at the thus-obtained disc-radial position is obtained. Actually, the disc recording area is divided into 13 (=21−9+1) regions such that an approximate number of blocks of data is present in each turn of track for each region. The approximate number of blocks of data present in each turn of track of each region is different from those of the other regions. Therefore, after obtaining the disc-radial position from the advance-reading tail address, a relevant region is determined from among the 13 regions. Then, a number (approximate number) of blocks of data present in one turn of track is obtained from the thus-determined region. Then, from the thus-obtained number of blocks of data present in one turn of track, a relevant one of the reference number $X_R$ is calculated as mentioned above.

Instead of such a calculation, it is also possible to store table data indicating a relationship between the current advance-reading tail address and a relevant one of the reference number $X_R$ in the program ROM 32 shown in FIG. 2 or the like. In this case, from the obtained advance-reading tail address, the relevant reference number $X_R$ is obtained with reference to the table data.

In S21, using the thus-obtained reference number $X_R$, it is determined whether to proceed with the seeking operation or further continue the advance reading operation so as to reduce a time required for reaching the command address. In S23, if it is determined that the command address has been reached, S24 is performed and thus a data transfer operation is performed. In the data transfer operation, a requested length of blocks of data starting from a block of the command address is stored in regions of the buffer 30 respectively in sequence, and simultaneously is transferred to the host computer.

When the requested number of blocks of data has been transferred, S5 is performed and thus the advance reading operation performed after the current data transfer request is proceeded with. After the completion of S5, the current cycle of operation is terminated, and S1 is performed when another data transfer request is given.

Figure 9:
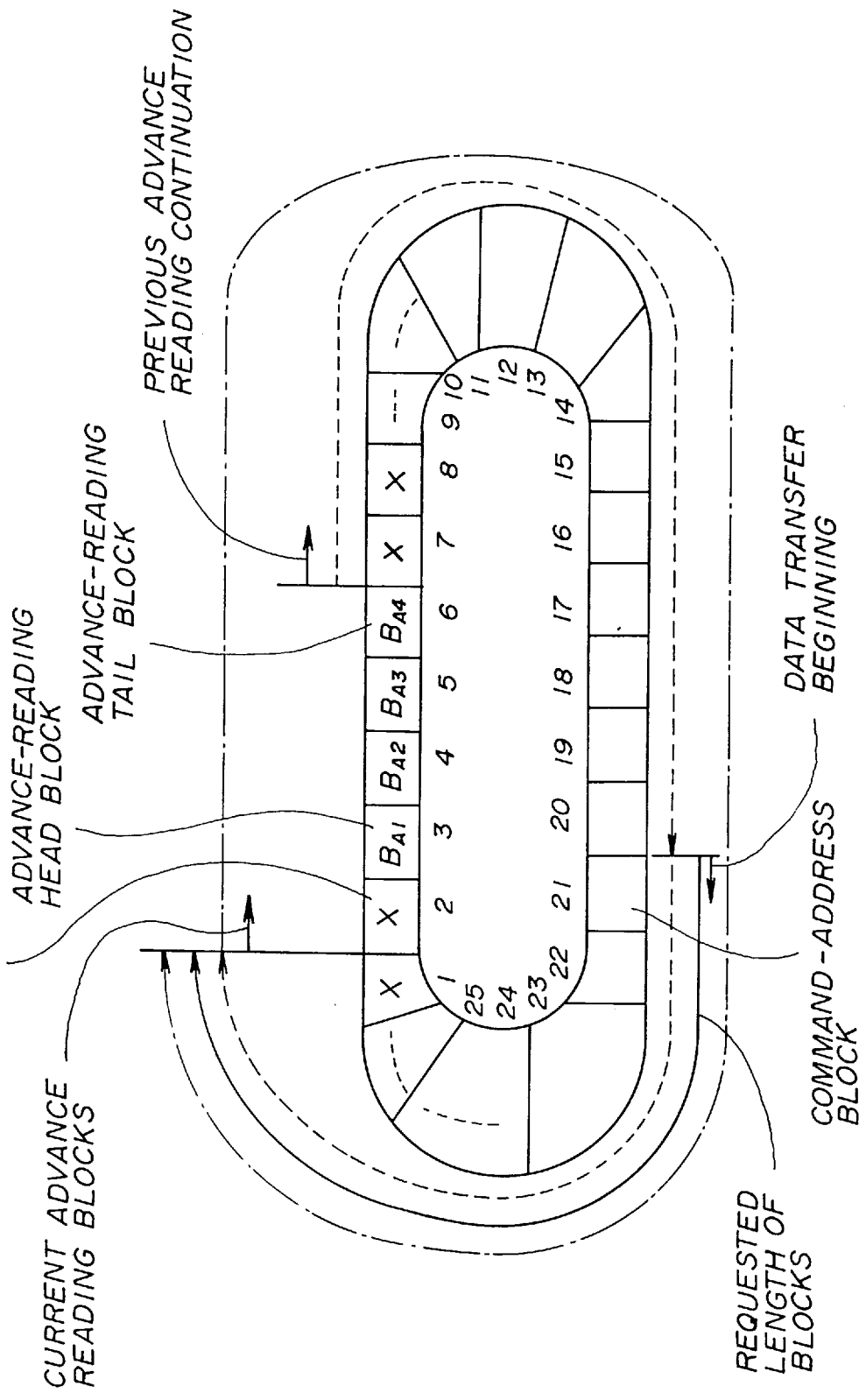
FIG. 9 illustrates data storage in the buffer in a case where an advance reading operation performed after a previous data transfer request is further continued in response to a current data transfer request.

FIG. 9 illustrates data storage in the buffer 30 in a case where the advance reading operation performed after the previous data transfer request is further continued in response to the current data transfer request.

In the example of FIG. 9, when the advance reading operation performed after the previous data transfer request is in progress, blocks of data have been stored in regions No.3 to No.6 respectively when the current data transfer request is given. In this example, S21 determines that a number resulting from subtracting the current advance-reading tail address from the command address is equal to or smaller than the reference number $X_R$. Accordingly, in S22 and S23, the command address is reached and then a reading operation in the advance reading operation is continued until a block of data of the command address is stored in the region No.21 of the buffer 30.

When the command address has been reached, in S24, a requested length of blocks of data starting from the block of the command address is stored in the regions No.21 to No.1 respectively, and simultaneously is transferred to the host computer. After all of the requested blocks of data including the block of data stored in the region No.1 has been transferred, S5 is performed and thus the advance reading operation performed after the current data transfer request is performed. Thus, blocks of data are stored in regions starting at the region No.2 of the buffer 30 respectively.

As long as another data transfer request is not given, in the advance reading operation in S5, 25 blocks of data are stored in the regions No.2 to No.1 respectively. After the completion of S5, the present cycle of operation is terminated, and S1 is performed when another data transfer request is given.

Thus, in the second embodiment of the present invention, in response to another data transfer request given during progress of the advance reading operation, the reference number $X_R$ is obtained for the disc-radial position, and using $X_R$, it is appropriately determined and thus surely selected whether further continue the advance reading operation or to proceed with a seeking operation so as to make a time required for reaching the command address shorter. Accordingly, regardless of disc-radial positions, a data transfer rate can be effectively improved.

Further, the present invention is not limited to the above-described embodiments, and variations and modifications may be made without departing from the scope of the present invention.

What is claimed is:

1. A disk apparatus, comprising:

reading means for reading data from a disk as a result of locating a pickup at a relevant track of said disk, said disk being rotated so that a linear velocity at which said pickup traces the track is fixed even when the track is different;

buffer means for temporarily storing data which has been read out through said reading means;

reading control means for responding to an externally given first data transfer request, thereby causing said reading means to read out first requested data from said buffer means if it is present, said reading control means causing said reading means to read out said first requested data from said disk if it is not present in said buffer means, said reading control means causing said reading means to further read data, subsequent to said first requested data, from said disk continuously after the reading of said first requested data from said disk, said data thus further read being stored in said buffer means; and determining means for determining, according to a radial position of said pickup along a radius of said disk, whether or not to cause said pickup to jump to a different track so as to reduce a time required for reaching a target position on said disk, wherein said determining means uses a reference value, said determining means causing said pickup to jump to a different track when the target position on said disk is located behind said pickup, said determining means also causing said pickup to jump to a different track when the target position on said disk is in front of said pickup and a distance to said target position is larger than said reference value, the reference value being variable according to the pickup radius position. and said determining means, when a second data transfer request is given during said reading means reading said data subsequent to said first requested data, determining whether to cause said reading means to further continue reading or to cause said pickup to jump to a different track so as to reach second requested data.

2. The disk apparatus according to claim 1, wherein said reference value corresponds to approximately the length of one turn of the track at which said pickup is currently present.

3. The disk apparatus according to claim 1, wherein a track format of said disk is such that the tracks form a spiral.

4. The disk apparatus according to claim 1, wherein said disk comprises a CD-ROM.

5. The disk apparatus according to claim 1, wherein said buffer means comprises a ring buffer having a ring-shaped recording area, data being written over previously written data when data has been written onto all said recording area.

6. The disk apparatus according to claim 1, wherein said reference values are previously stored in a memory as table data.

* * * * *